(12) United States Patent
Wu

(10) Patent No.: US 12,168,251 B2
(45) Date of Patent: Dec. 17, 2024

(54) LIQUID-ABSORBING RAW MATERIALS PROCESSING SYSTEM AND OPERATING METHOD THEREOF

(71) Applicant: YI CHUN GREEN TECHNOLOGY CO., LTD., Taoyuan (TW)

(72) Inventor: Pei-Jen Wu, Taoyuan (TW)

(73) Assignee: YI CHUN GREEN TECHNOLOGY CO., LTD., Taoyuan (TW)

( * ) Notice: Subject to any disclaimer, the term of this patent is extended or adjusted under 35 U.S.C. 154(b) by 286 days.

(21) Appl. No.: 17/947,094

(22) Filed: Sep. 17, 2022

(65) Prior Publication Data

US 2023/0090670 A1    Mar. 23, 2023

Related U.S. Application Data

(60) Provisional application No. 63/272,164, filed on Oct. 26, 2021, provisional application No. 63/272,159, (Continued)

(51) Int. Cl.
*D21B 1/00* (2006.01)
*B01J 20/34* (2006.01)
(Continued)

(52) U.S. Cl.
CPC .............. *B09B 3/35* (2022.01); *B01J 20/3475* (2013.01); *B02C 19/22* (2013.01); *B02C 23/14* (2013.01); *B02C 23/20* (2013.01); *B02C 23/22* (2013.01); *B02C 23/36* (2013.01); *B03B 9/06* (2013.01); *B09B 3/38* (2022.01); *D21B 1/026* (2013.01); *D21B 1/061* (2013.01); *B02C 2023/165* (2013.01); *B09B 2101/67* (2022.01)

(58) Field of Classification Search
CPC ........ D21B 1/026; D21B 1/061; B02C 23/36; B02C 23/14; B02C 23/22; B02C 23/20; B02C 19/22
See application file for complete search history.

(56) References Cited

U.S. PATENT DOCUMENTS 5,292,075 A    3/1994  Bartlett
5,558,745 A    9/1996  Conway et al.
(Continued)

FOREIGN PATENT DOCUMENTS

CN    101096431 B    8/2010
CN    111979814 A  * 11/2020  ............... D21B 1/32
(Continued)

*Primary Examiner* — Faye Francis
(74) *Attorney, Agent, or Firm* — Cheng-Ju Chiang

(57) ABSTRACT

The present invention provides a liquid-absorbing raw material processing system and its operation method. The liquid-absorbing raw material processing system is composed of a cutting module, a bulk pulping module, a salt slurry processing module, and a liquid-absorbing raw material manufacturing module, which are connected in series. The operating method of the liquid-absorbing raw material processing system is to process absorptive articles such as diapers or sanitary napkins, etc., which are retained and made into fluff liquid-absorbing raw materials through the purification and separation steps performed by the modules of the liquid-absorbing raw material processing system.

12 Claims, 3 Drawing Sheets

Related U.S. Application Data filed on Oct. 26, 2021, provisional application No. 63/245,796, filed on Sep. 17, 2021.

(51) Int. Cl.

| | |
|---|---|
| *B02C 19/22* | (2006.01) |
| *B02C 23/14* | (2006.01) |
| *B02C 23/20* | (2006.01) |
| *B02C 23/22* | (2006.01) |
| *B02C 23/36* | (2006.01) |
| *B03B 9/06* | (2006.01) |
| *B09B 3/35* | (2022.01) |
| *B09B 3/38* | (2022.01) |
| *D21B 1/02* | (2006.01) |
| *D21B 1/06* | (2006.01) |
| *B02C 23/16* | (2006.01) |
| *B09B 101/67* | (2022.01) |

(56) References Cited

U.S. PATENT DOCUMENTS

| | | | |
|---|---|---|---|
| 11,673,172 B2 * | 6/2023 | Konishi | ............... B03B 9/061 |
| | | | 162/5 |
| 2015/0265737 A1 | 9/2015 | Yamaguchi et al. | |
| 2015/0275435 A1 | 10/2015 | Seki et al. | |
| 2020/0346261 A1 * | 11/2020 | Konishi | ............... B02C 23/36 |
| 2021/0039071 A1 * | 2/2021 | Yoshinaga | ......... B01J 20/28016 |

FOREIGN PATENT DOCUMENTS

| | | | | |
|---|---|---|---|---|
| CN | 212247650 U | * | 12/2020 | ............... D21B 1/32 |
| CN | 112941948 A | * | 6/2021 | ............... D21B 1/32 |
| CN | 113802401 A | * | 12/2021 | ............... D21B 1/32 |
| CN | 216615297 U | * | 5/2022 | ............... D21B 1/32 |
| WO | WO-2019087486 A1 | * | 5/2019 | ............. A61F 13/15 |

\* cited by examiner

LIQUID-ABSORBING RAW MATERIALS PROCESSING SYSTEM AND OPERATING METHOD THEREOF

TECHNICAL FIELD present invention is related to a liquid-absorbing raw materials processing system and operating method thereof. Specifically, the present invention is a waste treatment system and method which are used for processing different kinds of absorptive articles. The system of the present invention may decompose, purify and recycle absorptive articles, therefore to effectively reuse it.

BACKGROUND OF RELATED ARTS

The commercial absorptive articles such as the diaper, sanitary napkin is widely used in life of people, and the amount of using increases day by day. For instance, the aging society will face the increased needs of the adult diaper. That is, there are more adsorptive wastes need to be carefully disposed, preventing the pollution of the environment.

On the other hand, in the current arts, the equipment which is used for recycling the absorptive article has been invented, however the recycling efficiency and performance per se are not perfect enough. The reason is that the material which may be reclaimed from the absorptive article cannot be simply separated well. The diaper is a good example, the diaper as an absorptive article usually comprises skin-friendly non-woven fabric which is used for touching the skin, an absorptive layer which shows great ability of liquid absorption, a liquid-proof layer which is made from the liquid-proof plastic and the urination or defecation wastes which are wrapped in the absorptive article. Therefore, the abovementioned materials need to be separated and break into fiber, absorptive salts (e.g. sodium polyacrylate) or the plastic independently, and recycled. The complexity of the recycling work apparently increases the cost and burden of processing the absorptive waste for the industry.

Specifically, the absorptive salts such as the sodium polyacrylate is the most difficult part of recycling. The difficulty of recycling absorptive salts is that the "water" problem. In other words, the clogged and sticky absorptive salt is quite hard to be purified and recycled.

SUMMARY

To solve the problems mentioned in the prior arts, the present invention discloses a liquid-absorbing raw materials processing system and operating method thereof. The consumed absorbent hygiene products may be decomposed and recycled by the system of the present invention. This system uses specific methods of each module, therefor to separate the liquid-absorbing raw material therein. The raw materials may be reclaimed and being another reusable new product, realizing the re-use of waste.

Therefore, the present invention provides a liquid-absorbing raw materials processing system comprises a cutting module, a bulk pulping module, a salt slurry processing module and a liquid-absorbing raw material manufacturing module respectively. The bulk pulping module comprises at least one spoiler, a rotor and at least two blades. The liquid-absorbing raw material manufacturing module comprises serial connected centrifugal equipment, transient storage tank, vibrating equipment and sorting equipment. That is, the vibrating equipment further comprises a sieve. The sorting equipment further comprises a tank, and the tank comprises a plurality of stirring wings, an inlet, a liquid outlet and an outlet.

The present invention further provides an operating method of liquid-absorbing raw materials processing system, which comprises the following steps: the step (A) is to provide the aforementioned liquid-absorbing raw materials processing system. The step (B) is to put the absorptive article into the cutting module. Thereinafter, the step (C) is that the absorptive article which has been cut is transferred to the bulk pulping module, the bulk pulping module breaks and separates the absorptive article via centrifugal force, remaining an absorptive recycled material, and the step (D) is to transfer the absorptive recycled material to the salt slurry processing module and separating the absorptive recycled material, producing a primary liquid-absorbing material. The step (E) is that the centrifugal equipment further separates a secondary liquid-absorbing material and a first impurity from the primary liquid-absorbing material, and the secondary liquid-absorbing material is stored in the transient storage tank. The step (F) is to take the secondary liquid-absorbing material out of the transient storage tank and transferring to the vibrating equipment, and a terminal liquid-absorbing material and a second impurity are filtered out from the secondary liquid-absorbing material via eccentric vibration. At last, the step (G) is that the terminal liquid-absorbing material is transferred to the sorting equipment and be cleaned, and the outlet discharges a liquid-absorbing raw material.

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical effects of the present invention and to implement it in accordance with the contents of the specification, a preferred embodiment as shown in the figure is further described in detail as follows.

Figure 1:
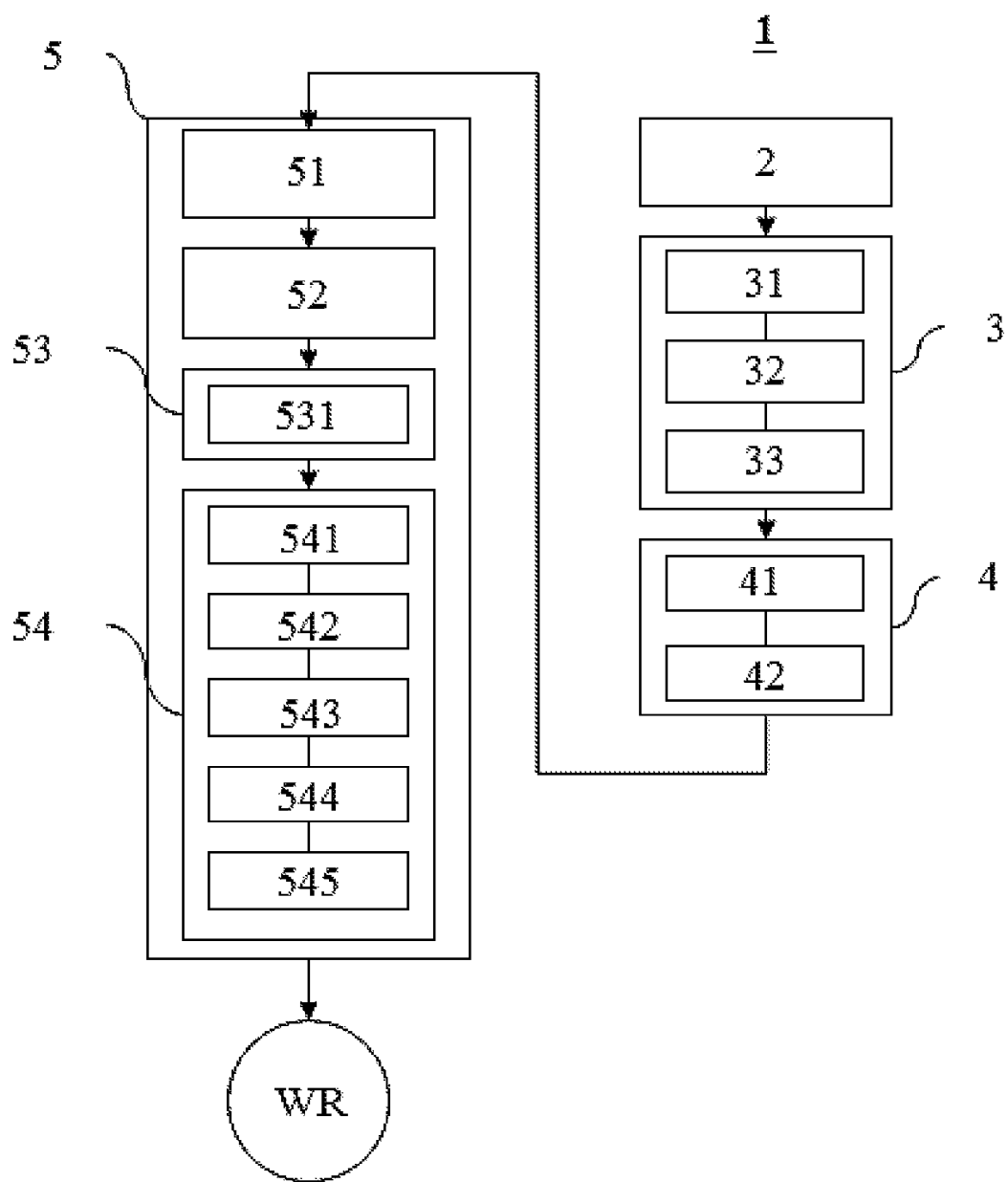
FIG. 1 is the schematic diagram of the components configuration of the embodiment of the liquid-absorbing raw materials processing system of the present invention.

Please refer to FIG. 1, FIG. 1 is the schematic diagram of the components configuration of the embodiment of the liquid-absorbing raw materials processing system of the present invention. The preferable embodiment of the present invention is a liquid-absorbing raw materials processing system 1 recited in FIG. 1. The liquid-absorbing raw materials processing system 1 comprises a cutting module 2, a bulk pulping module 3, a salt slurry processing module 4 and a liquid-absorbing raw material manufacturing module 5. In the present embodiment, the bulk pulping module 3 comprises a spoiler 31, a rotor 32 and blades 33. The liquid-absorbing raw material manufacturing module 5 comprises a centrifugal equipment 51, a transient storage tank 52, a vibrating equipment 53 and a sorting equipment 54. The vibrating equipment 53 comprises a sieve 531, and the sorting equipment 54 comprises a plurality of stirring wings 541, an inlet 542, a liquid outlet 543 and an outlet 544.

The different modules of the present embodiment with specific designs may serially and systemically process the used absorptive article such as the diaper or sanitary napkin. That is, the present embodiment may effectively decompose, separate and recycle the optimal reclaiming ability of the absorptive articles, especially the multiple separations are operated under serial connected modules, therefore to purify the liquid-absorbing raw material (e.g. sodium polyacrylate) from the absorptive article, increasing the efficiency of the re-use of the waste.

First of all, the liquid-absorbing raw materials processing system 1 of present embodiment is started from the cutting module 2. In this embodiment, the cutting module 2 is connected with the bulk pulping module 3. The cutting module 2 is used for breaking and separating the absorptive article. Hence, these materials may be easier to be separated well in the bulk pulping module 3, and increases bulk pulping efficiency in the bulk pulping module 3. In fact, the disc blades in the bulk pulping module 3 performs high torque to make the liquid force break and separate the absorptive article therein, and the fluff fiber in the bulk pulping module 3 will be separated and suspended without clogging.

Figure 2:
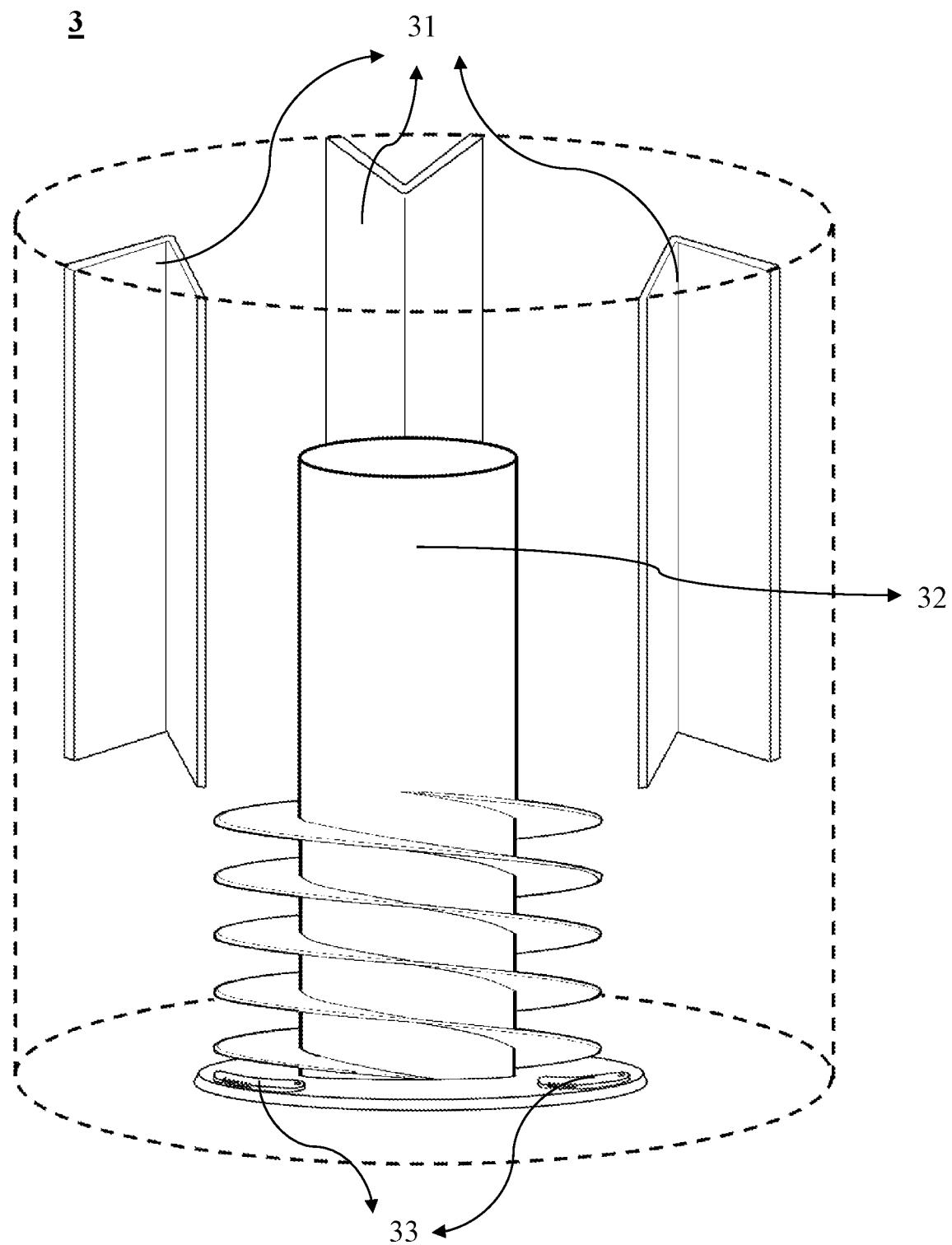
FIG. 2 is the schematic diagram of the bulk pulping module of the liquid-absorbing raw materials processing system of the present invention.

The inner structure of the bulk pulping module 3 is illustrated in FIG. 2. Please refer to FIG. 2, as shown in FIG. 2, the bulk pulping module 3 of the present embodiment comprises spoiler 31, rotor 32 and blades 33. The spoiler 31 may be single or multiple board or plate structure. The number of the spoiler 31 configured in the bulk pulping module 3 may create vortex when the liquid of the bulk pulping module 3 is rotating. Hence, the aforementioned material may be led to the blades 33 which are configured on the bottom of the bulk pulping module 3 via the undercurrent created by the aforementioned vortex. On the other hand, the blades 33 prevents the round clogging of the separated material.

In current embodiment, the blades 33 may be spiral blades or disc blade, and the number per se may be multiple. For instance, the number of the blades 33 shown in FIG. 2 are two, and the blades 33 are configured on the bottom of the bulk pulping module 3 symmetrically. Moreover, when the spoiler 31 of the present embodiment is designed to be constructed by multiple boards. The multiple boards are independently and symmetrically configured on the inner wall of the bulk pulping module 3 with certain distance from the center of the bulk pulping module 3. Therefore, the bulk pulping module 3 may keep balance during the rotation per se.

Specifically, in prior arts, chopper or shredder may break or cut the absorptive article and create the material leakage therein. However, the soft absorptive article may be seriously broken into small pieces which is difficult for the separation work thereafter. Therefore, the bulk pulping module 3 of the present embodiment further configures a rotor 32 and an inverter motor which is connected with the rotor 32. The rotor 32 may be the columnar rotor, which may use the liquid force to stir and separate the absorptive article, making the leakage of the fluff pulp therein. On the other hand, the present embodiment may detect the concentration of the pulp in preferred or real time, therefore to maintain the optimal control of operation. For instance, the gravity or optical level gauge may be used for monitoring in this embodiment.

Otherwise, in the present embodiment, the bulk pulping module 3 further comprises a gravity level gauge. The gravity level gauge may detect the liquid level therein via the weight of liquid, therefore to control the amount of the waste. In other words, when the liquid level of the bulk pulping module 3 has satisfied the pre-set value, the system may automatically feed the waste therein; the rotor 32 thus be able to rotate under the pre-set rotational speed and period of time. After the rotor 32 has finish the task per se, the liquid may be added to the aforementioned pre-set value again. In the same time, the plastic piece which has been broken or separated from the absorptive article will be suspended on the surface of liquid. On the other hand, the other matters such as the fluff pulp and the primary liquid-absorbing material may be settled down to the bottom of the bulk pulping module 3 naturally via the gravity. The following description may use the term "absorptive recycled material" to represent the settled matters. Specifically, to prevent the mentioned plastic piece forms clogging and interferes the purification steps thereon, an outlet may be allowed to be configured on the bulk pulping module 3 for removing the plastic piece from the bulk pulping module 3.

The absorptive recycled material processed by bulk pulping module 3 may be transferred to the salt slurry processing module 4 in next step. In the present embodiment, the salt slurry processing module 4 comprises a buffering tank 41 and a settlement tank 42. The buffering tank 41 is connected with the bulk pulping module 3, receiving the transferred absorptive recycled material from the bulk pulping module 3. The settlement tank 42 is connected with the buffering tank 41. The settlement tank 42 may separate the matters which has different densities in the absorptive recycled material such as primary liquid-absorbing material having relative high density (e.g. sodium polyacrylate) and the fiber material having relative low density (e.g. long fiber material/short fiber material). Specifically, the absorptive recycled material will be settled in layers due to the difference of density, therefore to form and separated into the primary liquid-absorbing material and fiber material. The absorptive recycled material may be supposed to contain fiber material formed by fluff pulp (specific gravity is 0.98), and the primary liquid-absorbing material having the specific gravity which ranges from 1.4 to 1.8. The primary liquid-absorbing material will form a clear and distinguishable layer on the bottom of the settlement tank 42 between the fiber material which is suspended in the liquid. In the practical use of this embodiment, the settlement tank 42 may further connects to a slurry storage tank which is used for collecting the fiber material (long fiber material/short fiber material).

Therefore, the salt slurry processing module 4 may control the input pressure (e.g. 0.13-0.36 Mpa) due to the actual input amount of matters for controlling the flow rate of the absorptive recycled material in the salt slurry processing module 4.

The primary liquid-absorbing material remains in the salt slurry processing module 4 will be re-transferred to the liquid-absorbing raw material manufacturing module 5, therefore to be purified. The purification mentioned here will be described as the first purification, the second purification and the third purification for reflecting different steps of purification work. In the present embodiment, the liquid-absorbing raw material manufacturing module 5 comprises centrifugal equipment 51, transient storage tank 52, vibrating equipment 53 and sorting equipment 54. The first purification is operated in the centrifugal equipment 51, the second purification is operated in the vibrating equipment 53, and the third purification is operated in such sorting equipment 54.

First, in the first purification, the primary liquid-absorbing material is transferred to the centrifugal equipment 51. The two-step separation is operated and a huge amount of first impurity will be separated from the primary liquid-absorbing material, producing a secondary liquid-absorbing material (the purified primary liquid-absorbing material). The secondary liquid-absorbing material may be transiently stored in the transient storage tank 52, making sure that secondary liquid-absorbing material may not be contaminated. On the other hand, the separated first impurity is respected to comprise fiber material (long fiber material/short fiber material) which has certain ration such as 80% therein. Specifically, in the present embodiment, the centrifugal equipment 51 is the cyclone separation units connected in series, therefore to purify the primary liquid-absorbing material and produce the secondary liquid-absorbing material. The number of the cyclone separation unit of the centrifugal equipment 51 of the present invention is not limited thereto, it may be adjusted via the users.

After the first purification, the secondary liquid-absorbing material will be transferred to the vibrating equipment 53, and the second purification will be operated. In the present embodiment, the vibrating equipment 53 comprises a sieve 531. The purpose of the sieve 531 is to effectively separate a second impurity from the secondary liquid-absorbing material via the eccentric vibration generated by vibrating equipment 53, producing a terminal liquid-absorbing material. The second impurity is supposed to comprise long fiber material of the fiber material and clogged secondary liquid-absorbing material. In the practical use of the present invention, the sieve 531 may comprise multiple pores with different diameters. For example, the diameter of the pore is preferred to be designed as shorter than 0.42 mm in the sieve 531.

At last, in the third purification, the sorting equipment 54 receives the terminal liquid-absorbing material from the vibrating equipment 53, and produce liquid-absorbing raw material WR (e.g. sodium polyacrylate) from the received terminal liquid-absorbing material.

In this embodiment, the sorting equipment 54 comprises a plurality of stirring wings 541, inlet 542, liquid outlet 543 and outlet 544. The terminal liquid-absorbing material may be input via inlet 542 respectively (e.g. 1-2 kg/time). On the other hand, a liquid (water) forms vortex in the sorting equipment 54, and the liquid is provided from the liquid outlet 543. The short fiber material of the terminal liquid-absorbing material will be suspended and stirring wings 541 removes the fiber material from the liquid. Hence, a liquid-absorbing raw material WR which has higher specific gravity sinks down to the lower part of the sorting equipment 54, therefore collect the liquid-absorbing raw material WR from the outlet 544. Specifically, the sorting equipment 54 may comprise a guiding tube 545 which is connected with the outlet 544 for improve the collection of liquid-absorbing raw material WR.

In present embodiment, the sorting equipment 54 may further comprise a liquid level controlling equipment for controlling the amount of the liquid inside the sorting equipment 54. For example, the liquid level controlling equipment may be designed as a siphon case.

Furthermore, the sorting equipment 54 of the present embodiment may configures multiple air holes or multiple down-blowing nozzles on the side of inlet 542, therefore to stir the liquid (water) and the terminal liquid-absorbing material under aeration. The stirring work under aeration may increase separation efficiency of the fiber material (increase the chance of separation from the terminal liquid-absorbing material). The air holes or down-blowing nozzles may be designed to control the aeration level or period of time, for enhancing the purification of the liquid-absorbing raw material WR.

Figure 3:
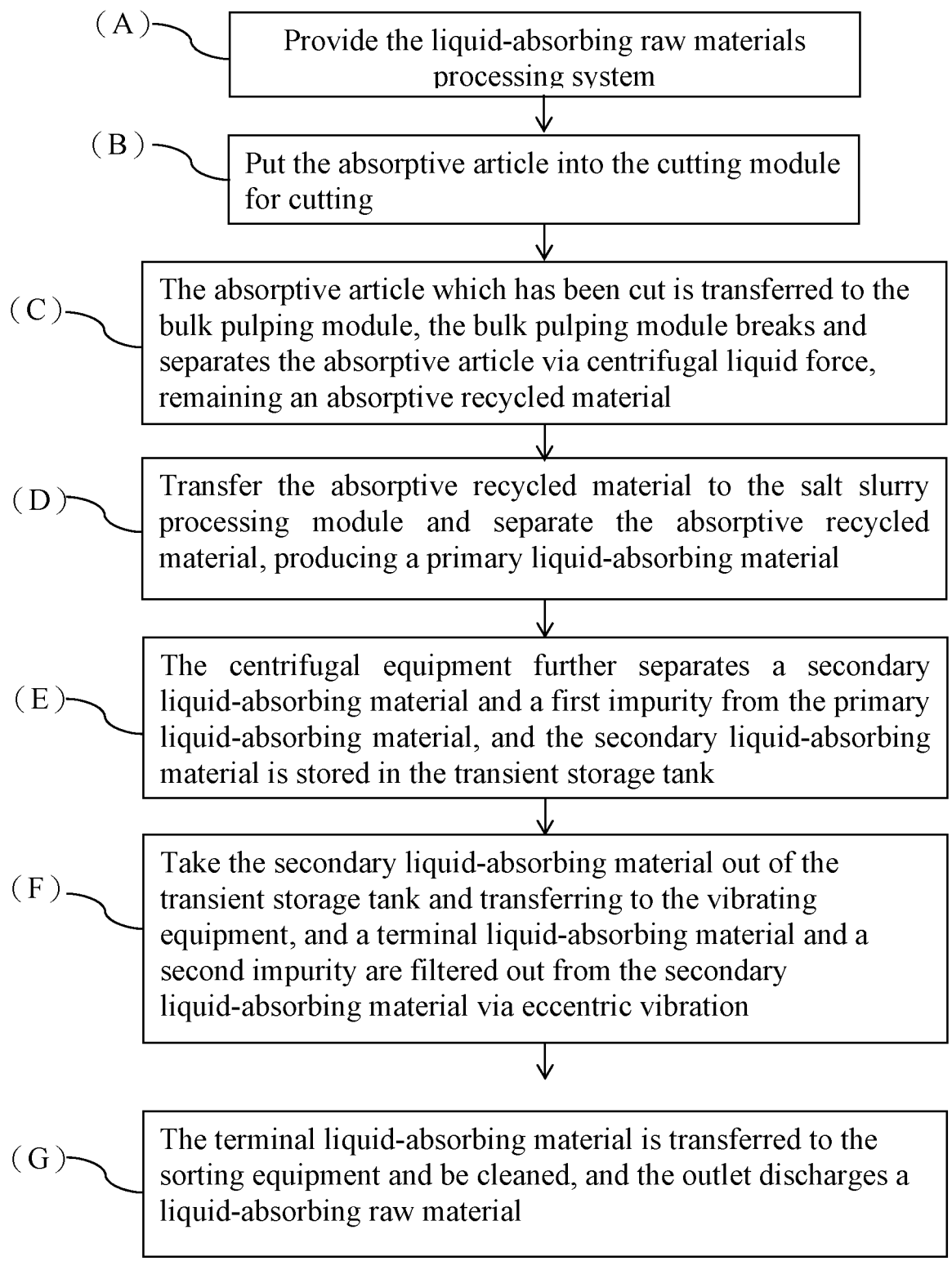
FIG. 3 is the flow chart of the operating method of the liquid-absorbing raw materials processing system of the present invention.

An operating method of the liquid-absorbing raw materials processing system 1 is provided in the present embodiment. The preferable embodiment is illustrated in FIG. 3. Please refer to FIG. 3, the operating method of liquid-absorbing raw materials processing system 1 comprises the following steps: in the step (A), provide a liquid-absorbing raw materials processing system 1 mentioned above. The step (B) is to put the absorptive article into the cutting module 2 for cutting. The step (C) is that the absorptive article which has been cut is transferred to the bulk pulping module 3, and the bulk pulping module 3 breaks and separates the absorptive article via centrifugal force, remaining an absorptive recycled material. Step (D) further transfers the absorptive recycled material to the salt slurry processing module 4 and separates the absorptive recycled material, producing a primary liquid-absorbing material. The step (E) the centrifugal equipment 51 further separates a secondary liquid-absorbing material and a first impurity from the primary liquid-absorbing material, and the secondary liquid-absorbing material is stored in the transient storage tank 52. The step (F) is to take the secondary liquid-absorbing material out of the transient storage tank 52 and transfer to the vibrating equipment 53, and a terminal liquid-absorbing material and a second impurity are filtered out from the secondary liquid-absorbing material via eccentric vibration. At last, the step (G) is that the terminal liquid-absorbing material is transferred to the sorting equipment 54 and be cleaned, and the outlet 544 discharges a liquid-absorbing raw material WR (e.g. sodium polyacrylate). In other words, the liquid-absorbing raw materials processing system 1 may further purify the primary liquid-absorbing material into the liquid-absorbing raw material WR such as sodium polyacrylate, increasing the re-use of the liquid-absorbing material such as industrial wastewater metal settling agent.

Please refer to FIG. 3 again. As shown in FIG. 3, the step (A) is to provide a liquid-absorbing raw materials processing system 1 as illustrated in FIG. 1. Thereinafter, the step (B) puts the absorptive article into the liquid-absorbing raw materials processing system 1. The absorptive article may be but not limited to personal hygiene products such as diapers, disposable diapers, nursing pads and sanitary pads. The absorptive article may be composed of fiber material (e.g. fluff fiber), water absorbing material and plastics. The cutting module 2 of the present embodiment may firstly cut the absorptive article (e.g. diapers and sanitary pads), and make the different matters contained in the absorptive article (e.g. fluff fiber, primary liquid-absorbing material or plastic piece) be separated easily in the following steps (C) to (G).

As shown in FIG. 3, in the step (C), the absorptive article which has been cut will be transferred to bulk pulping module 3. The centrifugal liquid force will be used for breaking and separating the absorptive article, filtering out the absorptive recycled material. The absorptive recycled material will be processed to the salt slurry processing module 4 in the following step (D). Specifically, the absorptive article which has been cut will be transported via transportation tool such as overhead crane and transferred to the bulk pulping module 3 after the step (B), therefore to be broken and separated by liquid force. The bulk pulping module 3 performs high torque to make the liquid force break and separate the absorptive article therein, and the fluff fiber in the bulk pulping module 3 will be separated and suspended without clogging. Therefore, the salt slurry processing module 4 in step (D) may be able to further separate the absorptive article.

In step (C), the bulk pulping module 3 may be designed to effectively remove the plastic pieces (e.g. a plastic outlet configured under the bulk pulping module 3) and produce the absorptive recycled material. The plastic piece may be the water-proof materials such as water-proof layers in diaper of the absorptive article. The absorptive recycled material may comprise fluff fiber material and primary liquid-absorbing material. In other words, the absorptive recycled material does not contain the plastic material of the absorptive article.

On the other hand, the bulk pulping module 3 of step (C) may automatically control the rotational speed, period of time or liquid level in bulk pulping module 3 when the bulk pulping module 3 is working. For instance, the "intermittent discharge" of pulp is used in step (C), preventing the continuous discharge clogs the pulp outlet which is the same as the inlet of absorptive article.

In step (D), the absorptive recycled material produced by step (C) will be transferred to the buffering tank 41 of salt slurry processing module 4 via the transportation tool such as the overhead crane. It makes the "minor mixture" contained by the absorptive recycled material temporally stop moving and retained in the bottom of the buffering tank 41. The mixture will be allowed to enter the settlement tank 42 for the separation in next step. In the settlement tank 42, the fluff fiber material and primary liquid-absorbing material which have different specific gravity will be separated via the settlement of gravity naturally. The settled primary liquid-absorbing material is then transferred to the liquid-absorbing raw material manufacturing module 5.

At last, steps (E) and (G) will be performed in the liquid-absorbing raw material manufacturing module 5. The main purpose of the mentioned steps is to purify the liquid-absorbing raw material such as sodium polyacrylate from the primary liquid-absorbing material. The primary liquid-absorbing material is transferred to the centrifugal equipment 51, and the first purification will be executed. A secondary liquid-absorbing material will be formed in the transient storage tank 52. Thereinafter, the secondary liquid-absorbing material is transferred to the vibrating equipment 53 for executing the second purification, producing a terminal liquid-absorbing material. On the other hand, the third purification will be executed in sorting equipment 54, producing the liquid-absorbing raw material WR form the received terminal liquid-absorbing material.

To sum up, the purpose of the present invention is to provide a liquid-absorbing raw materials processing system and operating method thereof. The present invention decomposes and recycles the used absorbent sanitary products by the system of the present invention. The system uses the specific methods of each module to completely separate the liquid-absorbing raw material therein. The raw material can be reclaimed and regenerated into other usable new materials. The present invention can effectively recycle waste. Considering the complexity of the absorbent hygiene product material per se, multiple modules are set up to separate and purify the contents in serial according to the gravity, density and material size of the contents.

As understood by a person skilled in the art, the foregoing preferred embodiments of the present invention are illustrated of the present invention rather than limiting of the present invention. It is intended to cover various modifications and similar arrangements comprised within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A liquid-absorbing raw materials processing system, comprising:
    a cutting module;
    a bulk pulping module, connected with the cutting module, and the bulk pulping module comprises at least one spoiler, a rotor and at least two blades;
    a salt slurry processing module, connected with the bulk pulping module; and
    a liquid-absorbing raw material manufacturing module, the liquid-absorbing raw material manufacturing module is connected with the salt slurry processing module, comprising:
        a centrifugal equipment;
        a transient storage tank, connected with the centrifugal equipment;
        a vibrating equipment, connected with the transient storage tank, the vibrating equipment comprises a sieve; and
        a sorting equipment, comprising a tank;
        wherein the tank comprises a plurality of stirring wings, an inlet, a liquid outlet and an outlet.

2. The liquid-absorbing raw materials processing system as claimed in claim 1, wherein the salt slurry processing module further comprises a buffering tank, a settlement tank or combinations thereof.

3. The liquid-absorbing raw materials processing system as claimed in claim 1, wherein the at least one spoiler is spoiling board, independently configured inside the bulk pulping module.

4. The liquid-absorbing raw materials processing system as claimed in claim 1, wherein the rotor is columnar rotor.

5. The liquid-absorbing raw materials processing system as claimed in claim 1, wherein the at least two blades are configured on bottom of the bulk pulping module.

6. The liquid-absorbing raw materials processing system as claimed in claim 1, wherein the sorting equipment further comprises a guiding tube, connected with the outlet.

7. An operating method of a liquid-absorbing raw materials processing system, comprising:
    (A) providing the liquid-absorbing raw materials processing system as claimed in claim 1;
    (B) putting the absorptive article into the cutting module for cutting;
    (C) the absorptive article which has been cut is transferred to the bulk pulping module, the bulk pulping module breaks and separates the absorptive article via centrifugal force, remaining an absorptive recycled material;
    (D) transferring the absorptive recycled material to the salt slurry processing module and separating the absorptive recycled material, producing a primary liquid-absorbing material;
    (E) the centrifugal equipment further separates a secondary liquid-absorbing material and a first impurity from the primary liquid-absorbing material, and the secondary liquid-absorbing material is stored in the transient storage tank;

(F) taking the secondary liquid-absorbing material out of the transient storage tank and transferring to the vibrating equipment, and a terminal liquid-absorbing material and a second impurity are filtered out from the secondary liquid-absorbing material via eccentric vibration; and (G) the terminal liquid-absorbing material is transferred to the sorting equipment and be cleaned, and the outlet discharges a liquid-absorbing raw material.

8. The operating method of a liquid-absorbing raw materials processing system as claimed in claim 7, wherein the bulk pulping module filters out a plastic piece after centrifugal force separation in the step (C).

9. The operating method of a liquid-absorbing raw materials processing system as claimed in claim 7, wherein the bulk pulping module further comprises a rotor, preventing the absorptive article forming round clogging after centrifugal force separation in the step (C).

10. The operating method of a liquid-absorbing raw materials processing system as claimed in claim 7, wherein the bulk pulping module further comprises at least one spoiler, which creates at least one vortex during rotation of the bulk pulping module, and undercurrent of liquid is created in the step (C).

11. The operating method of a liquid-absorbing raw materials processing system as claimed in claim 7, wherein the bulk pulping module further comprises at least two blades, accelerating the centrifugal force separation for the absorptive article in the step (C).

12. The operating method of a liquid-absorbing raw materials processing system as claimed in claim 7, wherein the salt slurry processing module further comprises a settlement tank, sinking the primary liquid-absorbing material of the absorptive recycled material via gravity in the step (D).

* * * * *